United States Patent

Peters

[15] 3,678,284

[45] July 18, 1972

[54] ENERGY SUPPLY APPARATUS AND METHOD FOR A BUILDING

[72] Inventor: Charles Michael Dansey Peters, 5 William Orchard Close, Old Headington, Oxford OX3 9DR, England

[22] Filed: Sept. 15, 1970

[21] Appl. No.: 72,301

Related U.S. Application Data

[63] Continuation-in-part of Ser. No. 851,373, Aug. 19, 1969, abandoned.

[30] Foreign Application Priority Data

Aug. 27, 1968 Great Britain......................40,969/68

[52] U.S. Cl..........................................290/1, 290/2, 290/30, 307/68
[51] Int. Cl.........................................................B60l 1/02
[58] Field of Search.....................290/1, 2, 30, 50; 307/64, 68

[56] References Cited

UNITED STATES PATENTS

| | | | |
|---|---|---|---|
| 2,130,606 | 9/1938 | Wanamaker | 290/2 X |
| 2,003,036 | 5/1935 | Callahan | 290/30 B |
| 381,815 | 4/1888 | Ries | 290/2 |
| 2,856,543 | 10/1958 | Dixon et al. | 290/30 |
| 2,972,056 | 2/1961 | Park et al. | 290/30 B |
| 2,313,439 | 3/1943 | Horton | 290/2 X |
| 2,337,164 | 12/1943 | Numero et al. | 290/2 |
| 2,051,240 | 8/1936 | Berryman | 290/2 |
| 2,076,382 | 4/1937 | Mirton | 290/2 |

Primary Examiner—G. R. Simmons
Attorney—Robert S. Dunham, P. E. Henninger, Lester W. Clark, Gerald W. Griffin, Thomas F. Moran, R. Bradlee Boal, Christopher C. Dunham, Robert Scobey and Henry T. Burke

[57] ABSTRACT

For supplying the electrical and thermal energy utilization systems of a residential or other building, means are provided for deriving energy from fuel, and an electrical generator driven by a prime mover that is energized by such fuel and that has provision for exhaust heat recovery is employed and arranged in association with electrical power from a conventional external source so that under coordinated control, e.g., automatically at certain times or conditions, the electrical generator is operated to supplant power from the external source for at least a part of the electrical utilization system while heat recovered from the prime mover supplants heat separately derived from the fuel energy means, for part or all of the required thermal energy, as for space heating and hot water.

9 Claims, 2 Drawing Figures

INVENTOR.
CHARLES MICHAEL DANSEY PETERS
BY Robert S. Dunham
ATTORNEY

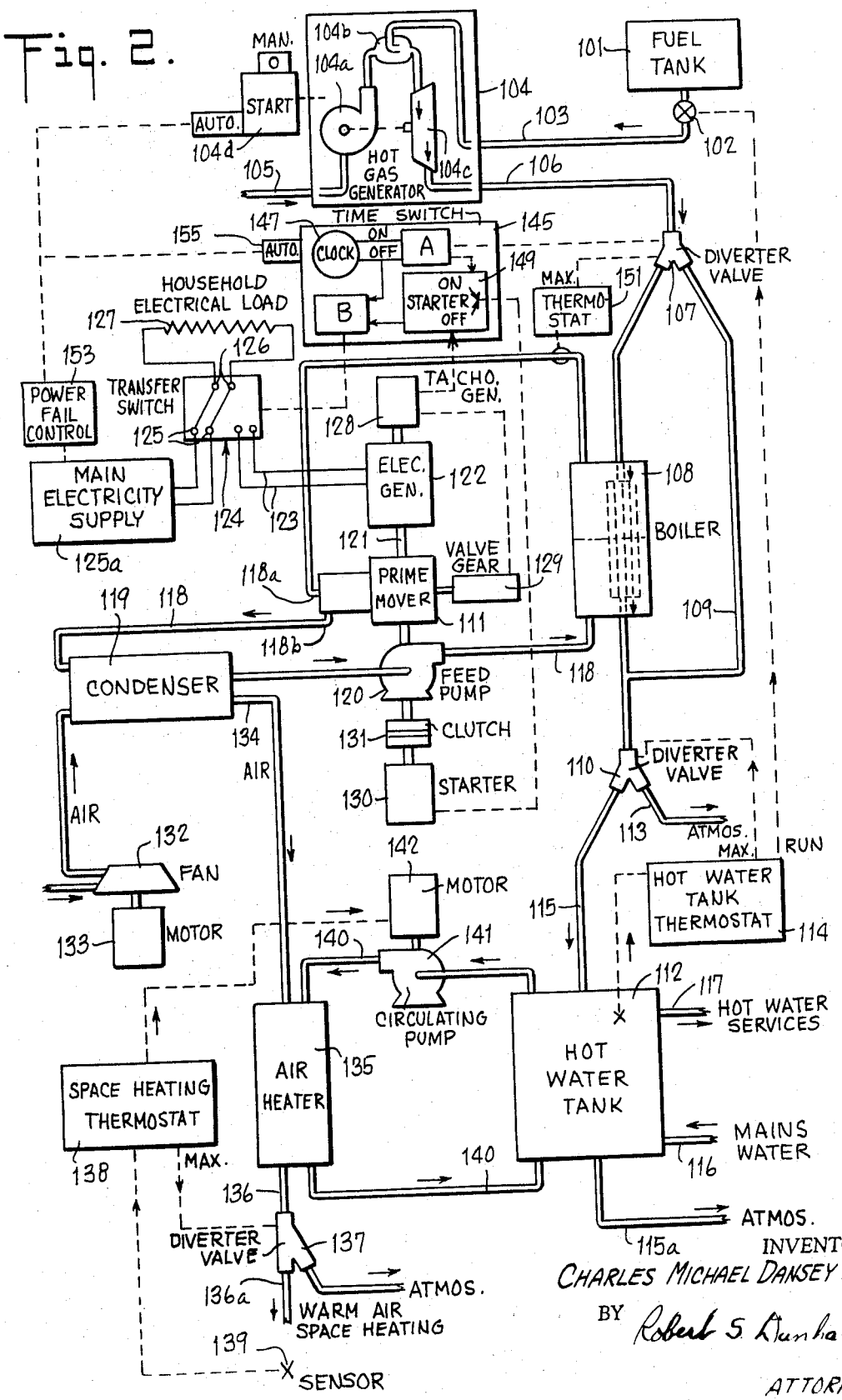

3,678,284

ENERGY SUPPLY APPARATUS AND METHOD FOR A BUILDING

CROSS-REFERENCE TO RELATED APPLICATION

This application is a continuation-in-part of my copending application Ser. No. 851,373, filed Aug. 19, 1969 for Energy Supply Apparatus and Method for a Building, now abandoned.

BACKGROUND OF THE INVENTION

This invention relates to energy supply systems for buildings and is particularly concerned with improvements in providing the necessary supply for residences or other buildings having an electrical energy utilization system and a thermal energy utilization system. Conventionally, electrical energy requirements in buildings have been met by connection to the usual power lines from a central station, while thermal energy needs, as for heating and hot water, have been satisfied by equipment that burns fuel such as oil or gas, or sometimes partly or even wholly by electrically energized equipment. Considered from the standpoint of the installation in the individual home or from the standpoint of a total community or power service region, the systems commonly employed have been characterized by problems or shortcomings in one or another of the areas of fuel economy, peak power loads, general efficiency, and maximum flexibility or adaptability to the individual energy needs of a given building and to cyclical, seasonal or other changes in such needs.

Accordingly, important aims of the present invention are to afford new energy supply apparatus and systems, suitable for use in buildings and notably in private residences or the like, which will afford improvement in areas such as outlined above, including betterment in one or more of the characteristics of efficiency, economy and adaptability. In its most complete embodiments, the invention affords new and effective systems for the utility needs of the building, including equipment for space heating, hot water supply, and electrical power supply or distribution, still further objects and advantages being as set forth or apparent in connection with the following description.

SUMMARY OF THE INVENTION

The invention provides apparatus for supplying energy to a building having an electrical supply network and an external main electricity supply, which apparatus comprises a prime mover, an electric generator coupled to the prime mover, means for recovering exhaust heat from the prime mover for use in heating or air conditioning the building, and control means for controlling the starting and stopping of the prime mover and for connecting the electrical supply network either to the supply generated by the generator or the main electricity supply.

In a more complete sense, the invention provides an energy supply system for a building as stated, comprising, in combination with a thermal energy utilization system of the building and an electrical energy utilization system of the building, the foregoing prime mover, electrical generator driven thereby, and control means, the prime mover being directly or indirectly fuel-energized, the system including means for recovering excess heat of fuel utilization, e.g., exhaust heat, when the prime mover is operating, and for supplying such recovered heat to the thermal energy utilization system, and the control means being operable to cause operation of the prime mover and generator according to a predetermined program, i.e., at determinable times, and being effective to connect the electrical energy utilization system to receive electricity from the generator when same is operating and to receive electricity from an external source at other times.

Preferably the control means works on a time clock basis set in accordance with statistical analyses of load requirements.

Preferably separate or separately operable heating means is provided for operating the heating or air conditioning system in the building when the prime mover is not in use, or supplementing the heat recovered from the prime mover if necessary when it is in use.

Preferably a hot gas generator, e.g., fuel-fired, is provided together with selectively operable means for directing heated gas to drive the prime mover or to a heating system for the building or to both as required.

Preferably the prime mover is driven by a heated medium circulated around a closed path and indirectly coupled in a heat transfer device to a hot gas flow path from the hot gas generator.

The invention also provides a method of supplying electrical energy to a building from two sources, one being an external main supply source and the other a local source, which method comprises generating electricity at the building by a generator driven by a prime mover, recovering exhaust heat from the prime mover for use in heating or air conditioning the building, and controlling the distribution of electrical energy from the two sources to the loads required in the building.

The invention includes a building having an external main electricity supply, an electrical supply network and apparatus as aforesaid for supplying energy.

BRIEF DESCRIPTION OF THE DRAWINGS

Embodiments of the invention will now be described by way of example and with reference to the accompanying drawings in which:

FIG. 2 shows a further system in more detail.

DETAILED DESCRIPTION

Figure 1:
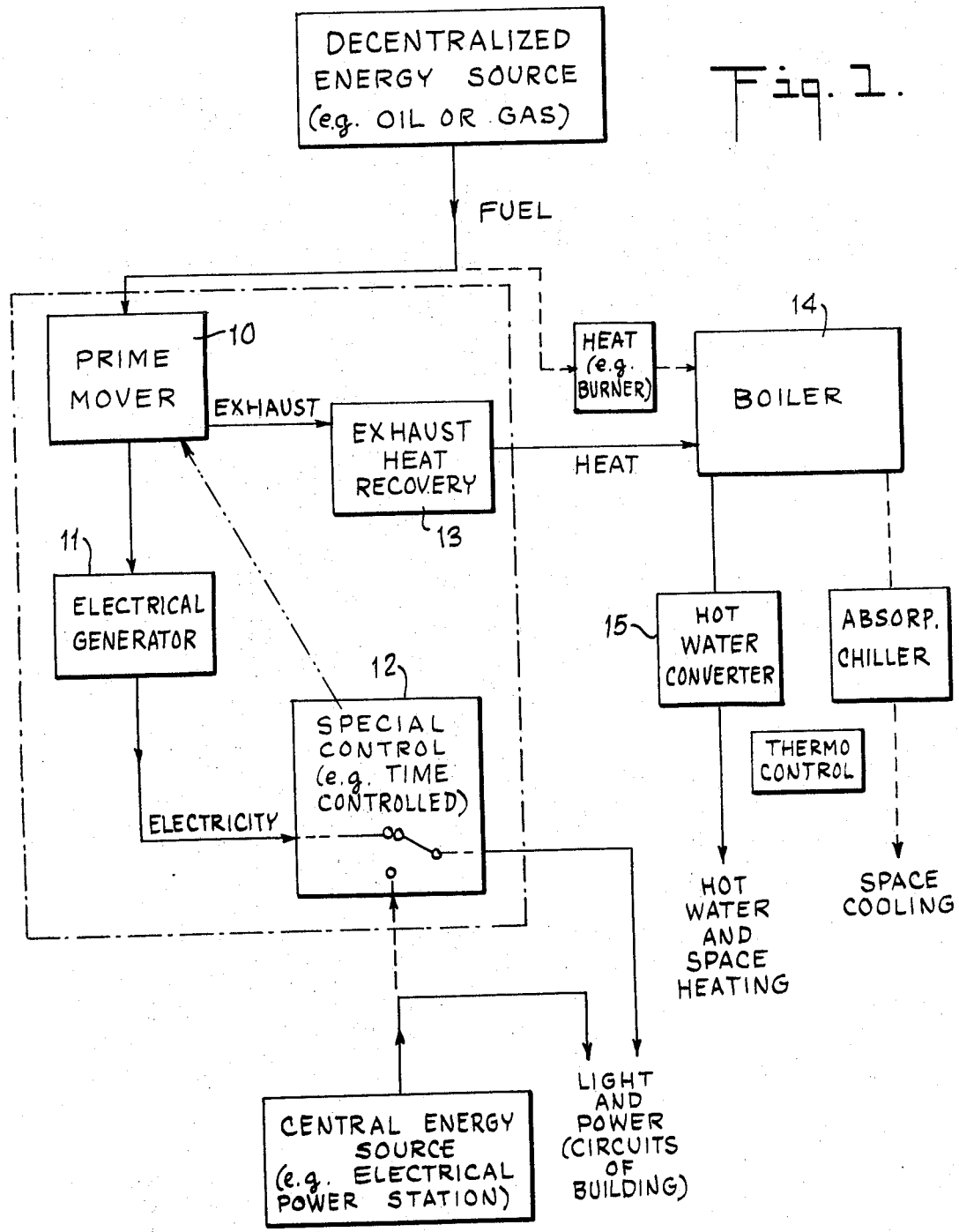
FIG. 1 shows the system in block schematic form.

In these examples electricity is supplied to a building from two separate sources, one source from an external main supply and the other source from a generator located within the building. The electricity from both these sources supplies electrical networks in the building. The generator is turned by a prime mover, which may be a turbine or reciprocating prime mover, and heat is recovered from the turbine exhaust for operating the heating or air conditioning systems in the building. One electrical network in the building can be switched by an automatic control to either the external main supply or to the supply from the local generator. The automatic control also controls the stopping and starting of the generator in dependence on the likely demand for both heat for operating the heating or air conditioning systems, and electricity.

In the embodiment illustrated in FIG. 1 oil from a store is fed to a turbine 10 located in the basement of a building. The turbine 10 turns an electrical generator 11. The electricity generated by the generator 11 is distributed via a control 12 to an electrical network in the building. Electricity is also supplied to the building from a central main electricity supply. The turbine 10 is fitted with an exhaust heat exchanger 13. The heat recovered from the exhaust of the turbine 10 is used for heating water in a boiler 14, which via a hot water converter 15, provides hot water and space heating for the building. The boiler is also fitted with a separate burner using fuel from the same store as that for the turbine. This burner provides the extra heat required in excess of that which can be recovered from the turbine exhaust, and can also provide heat for hot water and space heating when the turbine is not in operation. Electricity required in excess of that generated by the generator 11 in the basement is supplied from the main central electricity supply. At off peak periods when the demand for electricity is low the turbine is switched off and all the electricity supplied by the main central supply.

The operation of the turbine and generator and distribution of electricity is controlled by an automatic control 12. The turbine with heat recovery has around 75 percent efficiency. The overall efficiency obtained by this system will depend on how much heat and electricity are required at the same time. If a lot of one and very little of the other is required then the efficiency of the local turbine arrangement will fall very considerably. To maintain a high over-all efficiency the turbine is then stopped and all the electricity supplied from the external main supply and all the heat from the separate burner.

The automatic control 12 works on a time clock basis set in accordance with the results of statistical analyses of the load requirements. Thus the turbine is switched on by the automatic control 12 only when there is likely to be a reasonable demand for both electricity and heating. The turbine 10 is fitted with a standard electric battery type starting motor so that it may be started automatically.

In countries where heating in winter is required and no air conditioning in summer, the turbine unit is switched off completely in the summer season. In countries which require air conditioning in summer and no heating in winter, the unit is switched off completely in winter. In countries which require heating in winter and air conditioning in summer the turbine unit is used in both summer and winter, although different settings for the time control are required for the different conditions. Either an absorption cycle or steam jet cycle refrigerant can be used in the air conditioning plant.

Certain electrical networks are segregated so that they can be connected either to the local generator or to the mains, while the other networks remain connected to the external main supply all the time.

The turbine can be adjusted to alter its efficiency to suit different load conditions.

It will be seen that this system gives a very high overall efficiency compared with a heating and power system run wholly from an external main supply. The increase in efficiency provides conservation of energy and savings in the overall direct costs of light, power, heating and cooling for a building. The extra capital costs for installing the apparatus versus the costs of conventional systems are reduced to the minimum; for the apparatus, being geared to a specific segment of the energy requirements of a building, can be mass produced. Whereas service to the complete requirements of a building must be individualized, service to a segment can be standardized and the selected segment can represent a balance between electricity and heat for maximum efficiency. Appropriate standard sizes can be developed for buildings ranging from commercial and industrial to single-family residential. Its main saving comes at "peak periods" when there is a considerable demand for heat and electricity, it also reduces the peak load on the main central electricity supply. This is of considerable advantage as one of the main problems of supplying electricity from a central station is to provide sufficient equipment and sufficiently large cables to cope with the "peak loads" which only last a small fraction of the day. For the rest of the day the equipment is not being exploited to its full. With the present invention, however, the electricity supply from the on-site generator can be coordinated, by adjustment of the control, with the operation of the central main generating station to improve the economics of the latter while at the same time there is maximum efficiency in the on-site equipment.

The system has the further advantage in that, using two separate power supplies, if one fails, the other is able to provide an emergency supply. Widespread use of the system will be of benefit to national security, as it will result in a degree of economic dispersal of power generating facilities that are independent from vulnerable central generating plants.

The example in FIG. 2 is shown in some detail, and will be described particularly in reference to its design for use in single-family residences, although applicable in principle and with correspondingly appropriate controls to larger buildings. The system is also similar in principle to that shown in outline in FIG. 1 and the above description of the way of using the apparatus of FIG. 1 also applies to the apparatus of FIG. 2. In this example, fuel such as oil, is stored in a tank 101 on site at the building. Fuel can pass from the tank 101 through a control valve 102 in a pipe 103 to a hot gas generator 104. Air from the atmosphere enters the generator through an inlet pipe 105 and hot gas leaves the generator under pressure in pipe 106. This generator may be any suitable device embodying, for instance, an oil burner and a fan or compressor supplying air to the burner so that the hot gaseous products of combustion are delivered in the line 106 under pressure suitably higher than atmospheric. Although the fan can be independently driven, FIG. 2 shows, in simplified diagram, an arrangement wherein a compressor 104a delivers air to a burner 104b, from which the combustion gases pass through a turbine 104c which drives the compressor, the hot gas then discharging in pipe 106 at a relatively high pressure. As will be understood, the generator has suitable starting means 104d, e.g., manually operable, that may include a starter motor (not shown) for the compressor 104a, and that will function so that the latter is brought up to speed, the fuel valve is opened, the burner is ignited and the motor is then cut out when the turbine 104c takes over the compressor drive. One suitable hot gas producer of this type is a Progress Jets Ltd. (Lucas) generator designated by the name Chauffeur.

A selectively operable two way diverter valve 107 may direct the hot gas through a heat exchange device 108 or a by-pass pipe 109 to a second two way diverter valve 110. The heat exchanger device 108 may be a boiler for heating, e.g., vaporizing, a special fluid such as hexafluorobenzene. The purpose of the device 108 is to provide a source of energy for driving a reciprocating prime mover 111. Any heat remaining in the gas which passes through the device 108 or hot gas which passes through the by-pass pipe 109 can be used to heat water in a hot water tank 112 connected to the valve 110 by a pipe 115. The second outlet 113 from the valve 110 is vented to atmosphere. A thermostat 114 is connected to the water in the tank 112 and arranged to control both the diverter valve 110 and the fuel control valve 102 in dependence on the water temperature in the tank 112. In this way, the rate of operation of the hot gas generator 104 is automatically adjusted to suit the energy requirement in the building and the valve 110 can vent the hot gas to atmosphere to prevent overheating the water. Gas emerging from the tank 112 in the pipe 115a is vented to atmosphere, the pipe 115a being in effect a continuation of the hot gas line 115 after the heat exchange by coils or the like in the tank 112. A main water inlet 116, e.g., supplied from the usual municipal or like water system, is provided in the tank 112 and a hot water outlet 117 delivers hot water to the hot water services, i.e., various hot water taps, in the building.

It will be understood that, for example, the opening of fuel valve 102 can be adjustable upward from a basic minimum setting, to which it opens when the hot gas generator 104 is initially started, and the thermostat control 114 functions to adjust the valve 102 above such setting when and as the temperature of water in tank 112 may fall or tend to fall below a desired minimum or operating value, i.e., by adjustment sufficient to keep the water which is to be drawn from the tank, above such value. If the tank water temperature exceeds a predetermined maximum, the thermostat control 114 acts to shift the diverter valve 110 from connection solely to pipe 115, to a position where more or less of the hot gas is exhausted through the pipe 113, this and other diverter valves in the system being preferably adjustable from one end position to the opposite end position through infinitely variable intermediate settings permitting proportional flow in the two lines. Under ordinary circumstances, the thermostat 114 will only shift the valve 110 away from pipe 115 when the fuel valve 102 is at or has been brought to its minimum setting and the water nevertheless becomes too hot, for instance, as may occur after a considerable interval of little or no demand for hot water for any purpose from the tank.

The reciprocating prime mover 111, for example of the nature of a single-cylinder steam engine, is operated by heated fluid circulated around a closed loop 118. The fluid passes through the heat exchange device 108 where it becomes vaporized (when the valve 107 diverts hot gas through the device 108) and then at 118a into the prime mover 111 to drive it. The exhaust fluid leaving the prime mover 111 at 118b passes through a further heat exchanger 119 where it is condensed to a liquid and then through a circulating pump 120, which effects this circulation, back to the device 108. The prime mover 111 is connected through a crank and shaft connection, generally indicated at 121, to an electrical generator 122, preferably an alternating current generator. An electrical output from the generator 122 is taken along lines 123 to a transfer switch 124. This switch has input terminals 125 for connection to an external mains supply 125a and output terminals 126 connected to the electrical distribution network 127 in the building. This network 127, e.g., circuits serving lights, appliances and the like, constitutes an electrical energy utilization system of the building, and may in fact be all, or a selected part, of the totality of electrical circuits that make up such utilization systems of the building; to the extent that there are other circuits or systems not served under control of the switch 124, they will ordinarily be connected to receive current, e.g., at all times, from the external power supply line represented at 125a.

A tacho-generator 128 is coupled to the generator 122 to control the speed of the generator and thereby the frequency of current generated by the generator 122. This control is effected by a valve gear actuator 129 connected to the engine, i.e., the prime mover 111. It will be understood that the prime mover includes the usual valve gear (not shown) which in manner conventional for such engines controls the admission of hot fluid to the prime mover 111, and that the actuator 129, under the control of the tachogenerator 128, adjusts the cut off in supply of fluid in each engine stroke and thereby adjusts the power of the prime mover 111 and speed of the generator 122. Inasmuch as a system comprising a single cylinder reciprocator with the connected feed pump 120 will ordinarily not be self-starting, an electric starter motor 130 is provided to start the prime mover 111 and is arranged to drive the prime mover and pump 120 through a centrifugal clutch 131. A battery (not shown) can be provided to drive the motor 130, and the clutch 131 is arranged to cut off as soon as the prime mover 111 starts operating; alternatively, the motor 130 can be driven from the main power supply 125a if it is not contemplated to provide for emergency-type operation upon main power failure.

Although the prime mover can be any of a variety of kinds of engines that are fuel-energized (directly or indirectly), simplicity and good reliability are attained in the system of FIG. 2 with a single-cylinder reciprocating machine 111 having the usual mechanism of such steam engines. While other fluids, including water and conventional steam therefrom, can be used for supplying energy to the engine, convenient and efficient operation is attainable with special organic liquids or the like, e.g., hexafluorobenzene as presently preferred.

The heat exchanger 119 is provided in the exhaust circuit of the prime mover 111 to recover and use heat remaining in the exhaust fluid. A fan 132, driven by a motor 133, forces air from the atmosphere along a pipe 134 through the heat exchanger 119 so that the air becomes heated by the exhaust fluid. The pipe 134 is connected to an air heater 135. The warm air outlet 136 of the heater 135 passes through a further two way diverter valve 137 where the warm air, through pipe 136a may be used for warm air space heating in the building, or vented to atmosphere if not required. The valve 137 is controlled by a thermostat 138 having a detector 139 at a suitable position in the space to be heated.

The heat removed by the heat exchanger 119 may not be sufficient for the heating requirements or alternatively, warm air may be required when the prime mover 111 is not operating. To cover these situations, the air heater 135 can function as such by deriving heat from the hot water tank 112. Water from the tank 112 can be circulated around a closed loop pipe 140 by a pump 141 driven by an electric motor 142. The pipe 140 passes through the air heater 135 and is arranged to heat the air passing along the pipe 134 and emerging through pipe 136. The amount of heat drawn from the tank 112 and passed out as warm air is controlled by selective operation of the motor 142 which is under the control of the thermostat 138.

The stream of air passed through the condenser 119 and ultimately distributed in the building for space heating may be derived entirely from outdoors or may partly or wholly consist of recirculated indoor air, and in situations where the heater 135 operates as such, some of its air supply may conceivably originate as a stream directly recirculated from inside the building; selection of operation should be such as to afford maximum feasible recovery and use of heat from the condenser 119 and efficiency in requirement of further heat at the heater 135, while ensuring that the supplied air temperature at the condenser is sufficiently below the condensing temperature of the fluid in the system 118 for efficient condensing operation.

As will now be understood, the thermostat control 138 functions to prevent the desired room temperature in the building from exceeding a predetermined maximum, by shifting the valve 137 toward outside discharge to the extent necessary to correct departure above such maximum. Ordinarily this function is only brought into play: either (a) at times when no space heating at all is required; or (b) in a heating season, to the extent that reduction of the supply of additional heat in the heater 135, e.g., by continued non-operation of the pump 141, fails to bring the room temperature down to the set maximum. As also explained, the thermostat control 138 has a basic function in maintaining a desired minimum temperature (which in practice may be approximately the same as the maximum), by causing operation of the motor 142 and pump 141, for example for intermittent periods, to supply heat to the heater 135 from the hot water tank 112 and thus in effect by another route from the hot gas generator 104.

A time switch 145 is provided to maintain overall control of the periods of operation of the prime mover 111 and generator 122. The switch 145 controls operation of the diverter valve 107, the starter motor 130 for the prime mover and the transfer switch 124. When the prime mover 111 is not operating, the valve 107 directs hot gas from the generator 104 along the by-pass pipe 109 so that heat is drawn from the generator 104 as required by the hot water and warm air heating requirements in the building. When the prime mover is operating some warm air is derived from the heat exchanger 119 but the heat for water and any supplementary heat needed for warm air are derived from the hot gas passing through the device 108 to the valve 110.

The various control devices for systems of the invention may comprise known components for the defined functions, e.g., temperature sensing elements, means responsive thereto, switches, relays, reset means, signal circuits, electromagnetic or fluid-actuated or other operating devices for valves, and other required elements, and are therefore not detailed in the drawings, it being correspondingly sufficient to show or described the several functions or sequences in each instance. Thus the time switch 145 is shown, for purposes of illustration, with a diagrammatic indication of one suitable sequence of operation, e.g., under control of a clock 147 constituted to provide on and off controlling functions at presettable times. In response to such on signal, control means A shifts the diverter valve for flow of hot gas to the boiler 108 instead of the by-pass line 109, and also triggers a starter switch 149 which turns on the starter motor 130. Usually there is then a necessary lag while the boiler, so to speak, raises steam (i.e., vapor under pressure) and the reciprocating engine 111 begins to develop power until it reaches a running value of speed (higher than starting speed of the motor 130) which is sensed by the tachometer 128, whereupon the starter motor 130 is turned off, for instance by a signal from the tachometer to the control means 149. As will be understood, the clutch 131 is torque-sensitive so that automatically it engages whenever the motor 130 begins turning the prime mover 111 and disengages when the motor stops driving the latter. A final part of the on control cycle is that when the prime mover begins to drive the generator at running speed, the transfer switch 124 is shifted so that the electrical utilization network 127 of the house receives power from the generator line 123 rather than the main utility supply at 125; for example, this is shown as effected by a control means B under a signal, as from the starter control 149, that the motor 130 is shut off.

When the predetermined period for operation of the generator 122 expires, the various controls are turned off and reset as necessary, for example as illustrated by an off signal from the clock 147 which through the control A restores the diverter valve 107 to connection with pipe 109 (shutting down the boiler 108) and through control B restores the transfer switch 124 for power supply from the central station.

A further control for the system including the prime mover 111 comprises a thermostat 151 sensing the temperature, in the pipe system 118, of the hot vapor under pressure as delivered by the boiler 108, for controlling this temperature at a preset maximum, as for example by shifting the diverter valve 107 to divert hot gas (from the generator 104) into the bypass 109 to the extent necessary to correct or prevent excess vaporized fluid temperature, above such maximum. In operation, the minimum setting of the fuel valve 102 (above which it may be adjusted by the hot water tank thermostat 114), and thus the basic minimum hot gas output at 106, may conveniently be such as to provide sufficient power for the prime mover to accommodate the maximum electrical load required of the generator 122, in the network 127. Although provision can be made, for instance if desired for larger buildings, whereby the fuel valve 102 can be additionally controlled for greater needs of the prime mover, as by shifting to a higher preset minimum of such valve under control of the time switch 145, or by providing a joint control of the valve 102 by thermostats 151 and 114 to insure that the hot gas generation is sufficient for the needs of boiler 108 as well as the hot water tank 112, the simpler arrangement of a single minimum setting adequate for the prime mover and generator, as described above, is believed appropriate for single-family residences in many cases.

The system may advantageously include means for running the prime mover 111 and generator 122 at other than scheduled times, and may thus, for example, comprise means 153 responsive to failure of the main electrical supply, for automatically over-riding, as at 155, the timed function of the time control switch 145, and also starting the hot gas generator 104 (as at 157) if necessary, whereby much or all of the utility needs of the building are served in such emergency. It will also be understood that various elements or components have the usual safety controls (not shown), e.g., to shut off the fuel supply if the flame in the hot gas generator 104 goes out, or to close down other parts of the system in case of malfunction, and there may likewise be provision for recharging any batteries that may be used.

If refrigeration is required, a refrigeration unit may derive power either from the electric load network 127 or from the hot gas outlet emerging from the tank 112. The motor 133 is normally driven by the electrical load network 127. However, to cover starting should the external electric mains not be operating, it may be connected to receive power directly from the generator 122, or the fan 132 may be mechanically connected to the shaft of the prime mover 111.

In the above example of FIG. 2, the hot gas generator 104 may have a rating of 300,000 B.T.U./hr in which the gas in pipe 106 may be at about 450° C. and travelling at about 0.2 lb. per sec. The generator 122 may be a 5 kilowatt generator for a small residence; perhaps more usually, for residential needs, the generator capacity can be 10 kilowatts, and the hot gas generator may have a higher rating if and to the extent needed. These ratings are given as examples only.

The invention is not restricted to the details of the foregoing examples, but may be embodied in other ways without departure from its spirit. For instance other forms of prime mover could be used. The control 12 in FIG. 1, or equivalent control for a system such as in FIG. 2, could operate in response to the actual electrical load requirements in the building. The prime mover and generator need not be set in the basement of a building and could be used for supplying electricity and heat to a small group of buildings rather than a single building.

I claim:

1. An energy supply system for a building having connection to receive electrical power from an external source, comprising; in combination with a thermal energy utilization system of the building and an electrical energy utilization system of the building: an electrical generator, a fuel-energized prime mover having means for recovering excess heat of fuel utilization, said prime mover being arranged to drive the generator, and control means for the prime mover and generator, automatically operable at determinable times, for bringing said prime mover and generator into and out of operation and for connecting the electrical energy utilization system to be supplied with electricity from the generator when said generator is operating and to be supplied from the external source when the generator is not operating, said recovery means being arranged to supply heat to said thermal energy utilization system when the prime mover is operating, and said control means being actuated in accordance with a time program to cause actuation of the prime mover and generator and connection to the electrical utilization system during recurring predetermined intervals of high load in said electrical energy utilization system of the building.

2. A system as defined in claim 1, which includes separate means for supplying heat energy to said thermal energy utilization system, arranged: to augment the supply of heat from said recovery means when desired, and to provide the entire heat requirements of said thermal energy utilization system when the prime mover is not operating.

3. A system as defined in claim 2, which includes primary heat supply means including a fuel-burning device for supplying heat energy in a heated medium, and means receiving said heated medium for transferring heat energy to said prime mover to constitute the aforesaid fuel energization thereof, said primary heat supply means being also connected for transfer of heat energy from said heated medium in the aforesaid separate means for supply of heat energy to the thermal utilization system.

4. A system as defined in claim 3, in which said thermal energy utilization system comprises space heating means for the building, and which includes hot water heating means for the building, the aforesaid separate means being arranged to supply heat energy to said hot water heating means.

5. A system as defined in claim 1, including in combination a second electrical energy utilization system in the building, connected for supply from the external electrical power source, said control means coacting with said second system whereby the operation of the electrical generator under the control means effects supply of part of the building electrical requirements from the electrical generator when operating and effects supply of all such requirements from the external source when the generator is not operating.

6. Apparatus for supplying energy to a building having an electrical distribution network and an external main electricity supply, which apparatus comprises a prime mover, an electric generator coupled to the prime mover, means for recovering exhaust heat from the prime mover for use in heating or air conditioning the building, and control means having actuating means therefor operated to represent load requirements, for controlling the starting and stopping of the prime mover and for connecting the electrical distribution network either to the supply generated by the generator or the main electricity supply, to operate the prime mover and generator for supplying electricity to said network during determinable high load times and to maintain said prime mover and generator out of operation and to supply electricity to said network from said main supply, during other times, said actuating means being a time clock mechanism and said control means being actuated by said time clock mechanism set in accordance with statistical analysis of load requirements for said network.

7. Apparatus for supplying energy to a building as defined in claim 6, which includes means for directing heated energizing fluid to the prime mover, a hot gas generator, and selectively operable means, associated with said generator, for directing heated gas to said fluid-directing means for driving the prime mover, or to a heating system for the building, or to both as required.

8. Apparatus as defined in claim 7, in which said fluid-directing means comprises means for circulating the heated fluid around a closed path through the prime mover, and which includes a heat transfer device coupling said circulating path means with the selectively operable means that receives hot gas flow from the hot gas generator, so that said fluid is heated from said hot gas, said closed path also including a heat exchanging device through which the fluid passes in traveling back from the prime mover to the aforesaid heat transfer device, for recovering the exhaust heat from said fluid into a heating medium for the building.

9. A method of supplying electrical energy to a building from two sources, one being an external main supply source and the other a local source, which method comprises providing said local source by generating electricity at the building by a generator driven by a prime mover, recovering exhaust heat from the prime mover for use in heating or air conditioning the building, and controlling the distribution of electrical energy from the two sources to the loads required in the building, said controlling operation being effected automatically in accordance with determinations representative of required electrical load, so that at recurring determinable high load times of the building while electrical energy nevertheless remains available from the main supply source, the required electrical energy is supplied to the building at least in substantial part from the local source and at recurring other times is supplied wholly from the external source.

* * * * *

UNITED STATES PATENT OFFICE
CERTIFICATE OF CORRECTION

Patent No. 3,678,284    Dated July 18, 1972

Inventor(s) CHARLES MICHAEL DANSEY PETERS

It is certified that error appears in the above-identified patent and that said Letters Patent are hereby corrected as shown below:

In the data and abstract page, col. 1, line 12, after "Aug. 27, 1968" insert --and Nov. 27, 1969--

Col. 6, line 41, after "for" (first occurrence) insert --hot--

Signed and sealed this 23rd day of January 1973.

(SEAL)
Attest:

EDWARD M. FLETCHER, JR.
Attesting Officer

ROBERT GOTTSCHALK
Commissioner of Patents

FORM PO-1050 (10-69)